United States Patent
Yokoyama et al.

(10) Patent No.: US 7,235,897 B2
(45) Date of Patent: Jun. 26, 2007

(54) POWER SUPPLY UNIT FOR AUTOMOBILES, WHICH CAN PROVIDE BRAKING FORCE EVEN WHEN ABNORMALITY OCCURS IN THE POWER SUPPLY UNIT OF ELECTRICALLY DRIVEN BRAKE DEVICES

(75) Inventors: Atsushi Yokoyama, Matsudo (JP); Kenichiro Matsubara, Chiyoda (JP); Takaomi Nishigaito, Chiyoda (JP); Nobuyuki Ueki, Sagamihara (JP); Toshio Manaka, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 464 days.

(21) Appl. No.: 10/628,389

(22) Filed: Jul. 29, 2003

(65) Prior Publication Data

US 2004/0160122 A1 Aug. 19, 2004

(30) Foreign Application Priority Data

Feb. 13, 2003 (JP) ............................. 2003-034495

(51) Int. Cl.
*B60L 1/00* (2006.01)
(52) U.S. Cl. .................... 307/9.1; 303/122.05; 318/376
(58) Field of Classification Search ............... 180/65.1; 307/9.1; 303/122, 122.05, 122.03; 318/376

See application file for complete search history.

(56) References Cited

U.S. PATENT DOCUMENTS

| 5,654,859 | A  | * | 8/1997  | Shi ............................. 361/66 |
| 5,853,229 | A  | * | 12/1998 | Willmann et al. ............. 303/3 |
| 6,728,614 | B2 | * | 4/2004  | Matsubara et al. ........... 701/36 |
| 6,856,045 | B1 | * | 2/2005  | Beneditz et al. .............. 307/43 |
| 6,919,648 | B2 | * | 7/2005  | Bolz et al. ................ 290/40 C |
| 2002/0158511 | A1 | * | 10/2002 | Baumgartner et al. ...... 303/199 |
| 2003/0030322 | A1 | * | 2/2003  | Yokoyama et al. .... 303/122.04 |

FOREIGN PATENT DOCUMENTS

| DE | 10104191 A1 | 9/2001 |
| DE | 10104194 A1 | 9/2001 |
| JP | 2000-16262 A | 1/2000 |
| WO | WO 200266293 A1 * | 8/2002 |

* cited by examiner

*Primary Examiner*—Chau N. Nguyen
*Assistant Examiner*—Daniel Cavallari
(74) *Attorney, Agent, or Firm*—Antonelli, Terry, Stout & Kraus, LLP.

(57) ABSTRACT

A power-supply unit for automobiles, connected to an electrically-driven brake device which generates braking forces by being electrically driven, an electric generator capable of generating braking forces for a vehicle by power generation, and a storage device for storing electric power, the power-supply unit comprising a first power supply line for connecting the electric generator with the storage device, a second power supply line for connecting the first power supply line with the electrically-driven brake device, and power-source connection means provided on the second power supply line and have interrupting function.

18 Claims, 4 Drawing Sheets

POWER SUPPLY UNIT FOR AUTOMOBILES, WHICH CAN PROVIDE BRAKING FORCE EVEN WHEN ABNORMALITY OCCURS IN THE POWER SUPPLY UNIT OF ELECTRICALLY DRIVEN BRAKE DEVICES

BACKGROUND OF THE INVENTION

The present invention relates to a power-supply unit for automobiles, and more particular, to a power-supply unit for automobiles, in which electric power is supplied to an on-board electrically-driven brake device for generating braking forces with the use of electric power supplied from an electric power supply source.

Conventionally, an electrically-driven brake device for actuating electric motors with electric power and electric signals to generate braking forces has been known, which comprises two independent electric power sources E1, E2 and in which four wheel units are divided diagonally into two systems, the electric source E1 supplies energy to two wheel units for a left front wheel and a right rear wheel, and the electric source E2 supplies energy to two wheel units for a right front wheel and a left rear wheel (for example, see JP-A-2000-16262, page 3 & FIG. 1).

With the above device, a power-supply unit of the electrically-driven brake device comprises two electric power supply sources, and the two electric power supply sources independently supply electric power to the two divided systems of the device. Therefore, even when failure occurs in one of the electric power supply sources and so one system of the electrically-driven brake device does not operate normally, the other system of the electrically-driven brake device operates normally, so that it is possible to realize an electrically-driven brake device of high reliability.

In the above-described conventional electrically-driven brake device, reliability is heightened by the two electric power supply sources and the divided two systems, so that the electrically-driven brake device and the power-supply unit are in some cases made complex in constitution. In order to supply an electrically-driven brake device of high reliability while holding down an increase in cost, the electrically-driven brake device and the power-supply unit are desirably able to ensure sufficient braking forces at all times without complexity in constitution.

BRIEF SUMMARY OF THE INVENTION

It is an object of the invention to provide a power-supply unit for automobiles, which is simple and high in reliability to be able to ensure sufficient braking forces even in the case where abnormality occurs in the power-supply unit or an electrically-driven brake device.

To attain the object, according to the invention, sufficient braking forces can be ensured by the use of a braking torque of an electric generator even in the case where abnormality occurs in the power-supply unit or the electrically-driven brake device.

Therefore, the power-supply unit comprises a first power supply line for connecting an electric generator to a battery device, a second power supply line for connecting the first power supply line to an electrically-driven brake device, and power-source connection means provided on the second power supply line to have an interrupting function. Thereby, since that power supply line of the electrically-driven brake device, in which abnormality occurs, can be separated from a normal power supply line, it is possible to maintain braking forces by means of the electric generator, thus enabling realizing a simple power-supply unit of high reliability.

Also, since power-source connection means is provided to function to make interruption between an annular power supply line and respective junctions, whereby that power supply line, in which abnormality occurs, can be separated from a normal power supply line, so that it is possible to maintain braking forces by means of the electric generator or the electrically-driven brake device, thus enabling realizing a power-supply unit of higher reliability.

Also, the first power supply line and the second power supply line, respectively, are connected to a terminal of the storage device (battery) via the power-source connection devices respectively having interrupting functions, whereby that power supply line, in which grounding occurs, can be insulated and separated from grounding of the first power supply line or the second power supply line, thus enabling realizing a simpler power-supply unit of high reliability.

Also, parts of the first power supply line and the second power supply line are covered by a grounding preventive member other than a wire-coating (i.e., covered by a member, which is not a wire-coating, for preventing a ground fault), whereby parts of the first power supply line and the second power supply line can be prevented from grounding (or ground fault, thus enabling realizing a simpler power-supply unit of high reliability.

Also, an electric power supply source having a storage function or a power generation function is provided on the second power supply line, whereby electric power can be supplied to the electrically-driven brake device from the electric power supply source even in the case where abnormality occurs in the storage device, thus enabling realizing a power-supply unit of higher reliability.

Also, there are provided electric loads other than the electrically-driven brake device and connected to the first power supply line, a power-source connection device arranged between the first power supply line and the electric loads, and a power-source control device for detecting interruption between the electrically-driven brake device and the first power supply line to control connection of the power-source connection device, so that it is possible to surely generate a braking torque by means of the electric generator also in the case where abnormality occurs in the electrically-driven brake device, thus enabling a power-supply unit of higher reliability.

Other objects, features and advantages of the invention will become apparent from the following description of the embodiments of the invention taken in conjunction with the accompanying drawings.

DETAILED DESCRIPTION OF THE INVENTION

Embodiments of a power-supply unit according to the invention will be described hereinafter with reference to the drawings.

First Embodiment

Figure 1:
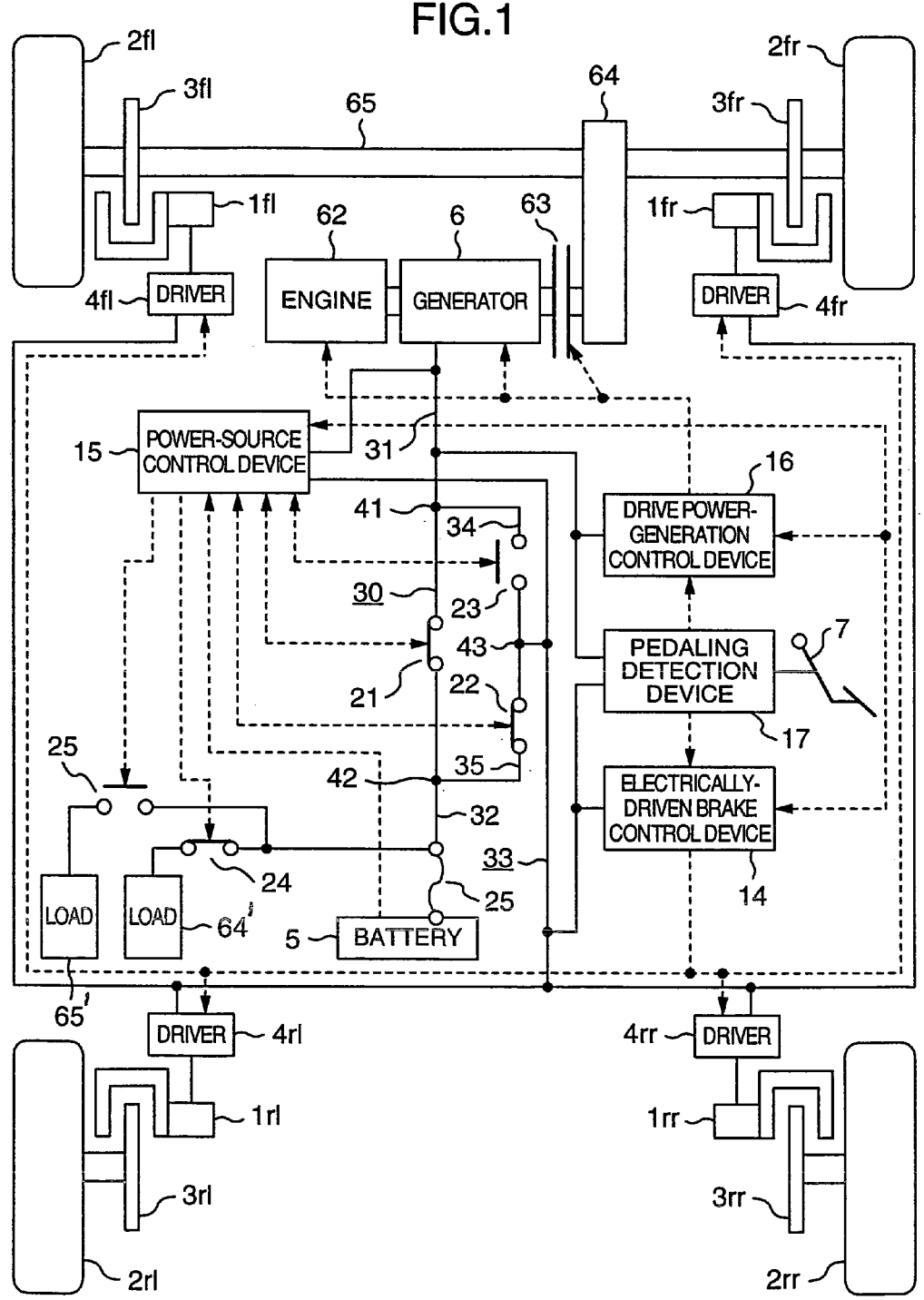
FIG. 1 is a view showing a system configuration of a power-supply unit according to a first embodiment of the invention.

FIG. 1 shows a system configuration of a first embodiment of the invention.

A power-supply unit according to the first embodiment is connected to an electrically-driven brake device which generates a braking force by being electrically driven, an electric generator 6 capable of generating a braking force on a vehicle through generation of electric power, and a battery 5 serving as a storage device for storing electric power, and mainly comprises a first power supply line 30, a second power supply line 33, power-source connection devices 21 to 23, and a power-source control device 15.

The battery 5 and the electric generator 6 are connected to each other by the first power supply line 30, and the first power supply line 30 comprises a power supply line 31 connected to the electric generator 6, a power supply line 32 connected to the battery 5, and the power-source connection device 21 having an interrupting function and connecting the power supply line 31 and the power supply line 32 to each other. The first power supply line 30 is connected to drivers 4fl, 4fr, 4rl, 4rr of the electrically-driven brake device by the second power supply line 33. The second power supply line 33 is connected to the power supply line 31 at two junctions. The second power supply line 33 comprises a junction 41 with the power supply line 31, a junction 42 with the power supply line 32, a branch point 43, a power supply line 34 between the junction 41 and the branch point 43, and a power supply line 35 between the junction 42 and the branch point 43. The power-source connection device 23 is arranged on the power supply line 34, and the power-source connection device 22 is arranged on the power supply line 35. The power supply line 32 is connected to electric loads 64', 65', other than the electrically-driven brake device, respectively through power-source connection devices 24, 25. The electric load 64' is one, which acts at the time of braking on the vehicle, and for example, a stop lamp. The electric load 65' is one irrespective of braking control on the vehicle, and for example, a fog lamp of less frequency in use, an electric load such as heating wire for frost protection, or the like, or an exclusive electric load for consumption of electric power generated by braking torque due to electric power generation.

The power-source connection devices 21 to 23 comprise electronic control switches for detecting current values and voltage values on the power supply lines to transmit electric signals, corresponding to such values, to the power-source control device 15 and for controlling connection and interruption of internal relay switches according to drive currents from the power-source control device 15. The power-source connection devices 24, 25 comprise electronic control switches for controlling connection and interruption of internal relay switches according to drive currents from the power-source control device 15.

A pedaling detection device 17 transmits electric signals, corresponding to an amount of stepping on a brake pedal 7, to an electrically-driven brake control device 14 and a drive power-generation control device 16. The electrically-driven brake control device 14 for controlling the electrically-driven brake device, the drive power-generation control device 16 for controlling the electric generator 6 and an engine 62, and the power-source control device 15 are connected to one another so as to be able to have communication with one another.

The electrically-driven brake device comprises electrically-driven calipers 1fl, 1fr, 1rl, 1rr, drivers 4fl, 4fr, 4rl, 4rr, and the electrically-driven brake control device 14. A left front wheel 2fl, a right front wheel 2fr, a left rear wheel 2rl, and a right rear wheel 2rr are respectively provided with disc rotors 3fl, 3fr, 3rl, 3rr, which rotate therewith. The electrically-driven calipers 1fl–1rr are arranged in the vicinity of the disc rotors 3fl–3rr. The electrically-driven calipers 1fl–1rr, respectively, comprise brake friction pads (not shown) arranged on both surfaces of the disc rotors 3fl–3rr, and brake motors (not shown) to generate clamp forces to press the brake friction pads against surfaces of the disc rotors 3fl–3rr. The drivers 4fl–4rr are connected to the electrically-driven calipers 1fl–1rr. The drivers 4fl–4rr comprise circuits for feeding electric power corresponding to command signals supplied from the electrically-driven brake control device 14, to the electrically-driven calipers 1fl–1rr. The respective electrically-driven calipers 1fl–1rr generate clamp forces corresponding to electric power fed from the drivers 4fl–4rr.

A rotating shaft of the electric generator 6 is connected to a crankshaft of the engine 62 and a clutch 63. The electric generator comprises, for example, a motor-generator having both functions of driving and electric power generation. Drive torque of the engine 62 is transmitted to the left and right front wheels 2fl, 2fr via the electric generator 6, clutch 63, transmission 64, and a drive shaft 65. Also, when a power generating toque of the electric generator 6 is larger than a drive torque of the engine 62, the power generating toque makes a braking torque on the vehicle to act on the left and right front wheels 2fl, 2fr. The drive power-generation control device 16 controls electric power generated by the electric generator 6, braking torque produced by electric power generation (braking torque due to electric power generation), drive torque of the engine 62, and connection and disconnection of the clutch 63 in response to amounts of stepping on the brake pedal 7 and an accelerator pedal (not shown) and an operating state of the vehicle.

In the above-described power-supply unit according to the embodiment, the electric generator 6 and the battery 5 supply electric power to the electrically-driven calipers 1fl–1rr on a normal occasion. Accordingly, when abnormality such as grounding (or ground fault) and breakage of wire occurs in the first power supply line 30, or the second power supply line 33, or devices connected to these power supply lines, there is a fear that the electrically-driven calipers 1fl–1rr cannot be actuated. With the power-supply unit according to the embodiment, when abnormality occurs in the first power supply line 30, or the second power supply line 33, or devices connected to these power supply lines, braking forces can be ensured for either the electrically-driven brake device or the electric generator 6 by controlling a state of connection and interruption of the power-source connection devices 21–23 to insulate and separate those parts, in which abnormality occurs. Further, since a plurality of storage devices and electrically-driven brake devices of multiple systems are not necessary as an electric power supply source for the electrically-driven brake device, it is possible to realize a power-supply unit and an electrically-driven brake device, which are simple in construction and high in reliability.

A description will be given hereinafter to an operation of the power-supply unit having the above-described structure.

<Normal Occasion>

The pedaling detection device 17 determines whether the brake pedal 7 has been stepped on and thus whether a demand for braking has been made. In the case where it is determined that the demand for braking has been made, the pedaling detection device 17 calculates a demanded braking force in accordance with a magnitude, by which the brake pedal 7 is stepped on, to transmit a corresponding electric signal to the electrically-driven brake control device 14 and the drive power-generation control device 16. The drive power-generation control device 16 calculates braking torque due to electric power generation, which can be generated, in response to the charging capacity of the battery 5 to control braking torque due to electric power generation of the electric generator 6 and to transmit information of the braking torque due to electric power generation to the electrically-driven brake control device 14. The electrically-driven brake control device 14 calculates target braking forces for the respective wheels on the basis of a demanded braking force, the braking torque due to electric power generation and an operating state of the vehicle to output to the drivers 4fl–4rr signals corresponding to the target braking forces. The drivers 4fl–4rr control the respective electrically-driven calipers 1fl–1rr so that braking forces for the respective wheels give target braking forces.

Electric power is supplied to the drivers 4fl–4rr through the first power supply line 30 and the second power supply line 33 from the battery 5 and the electric generator 6. At this time, the power-source connection devices 21, 22 are put in a state of connection and the power-source connection device 23 is put in a state of interruption.

In this manner, braking torque due to electric power generation produced by the electric generator 6 and a braking torque produced by the electrically-driven brake device are combined to control braking of the vehicle. Upon braking, the generator is driven by the wheels so that an electric power is generated. This is referred to as "regeneration braking."

<Abnormal Occasion>

An operation of the power-supply unit will be described hereinafter in the case where abnormality occurs in the first power supply line 30, or the second power supply line 33, or principal devices connected to these power supply lines. Also, in the case where abnormality is detected, warning is quickly given to a driver against abnormality by the use of the power-source control device 15, for example, an alarm lamp, alarm sound, or the like. Also, when abnormality occurs, vehicular movements are restricted so that the vehicle does not undergo a change to a dangerous state. For example, during stoppage, driving is restricted so that the vehicle cannot depart.

<Abnormality in Devices Connected>

In the case where the battery 5 is consumed and cannot supply a sufficient electric power to the electrically-driven calipers 1fl–1rr, the power-source control device 15 detects voltage drop in the power-source connection devices 21, 22 to warn a driver thereof. At this time, electric power generated by the electric generator 6 is supplied to the electrically-driven calipers 1fl–1rr and the electrically-driven brake control device 14. Supplying of electric power is maintained by disconnecting the clutch 63 near at a vehicle stopping speed and driving the electric generator 6 with the engine 62. Accordingly, the electrically-driven calipers 1fl–1rr can be kept in a state to be able to generate braking forces, and braking torque due to electric power generation of the electric generator 6 can be ensured.

In the case where abnormality occurs in the electric generator 6 and electric power supply by electric power generation cannot be performed, the power-source control device 15 detects abnormality in the drive power-generation control device 16 to warn a driver thereof. At this time, electric power is supplied from the battery 5 to the electrically-driven calipers 1fl–1rr and the electrically-driven brake control device 14. Accordingly, the electrically-driven calipers 1fl–1rr can be kept in a state to be able to generate braking forces.

In the case where abnormality occurs in the electrically-driven brake device and braking forces by the electrically-driven calipers 1fl–1rr cannot be generated, the power-source control device 15 detects abnormality in the electrically-driven brake control device 14 to warn a driver thereof. At this time, the electric generator 6 charges the battery 5 with generated electric power to thereby generate braking torque due to electric power generation to generate braking forces for the vehicle. Also, in the case where the battery 5 is in a fully charged state and charging sufficient for braking force generation cannot be made, the power-source control device 15 controls the power-source connection device 25 in a state of connection to thereby cause the electric load 65 to consume electric power generated by the electric generator 6.

In this manner, also in the case where abnormality occurs in one of the electrically-driven brake device, the battery 5 and the electric generator 6, braking forces for the vehicle can be generated by the electrically-driven brake device or the electric generator 6.

<Disconnection>

In the case where disconnection occurs on the first power supply line 30 between the electric generator 6 and the junction 42, the power-source control device 15 detects abnormality on the basis of voltage difference between the electric generator 6 and the second power supply line 33 to warn a driver thereof. At this time, electric power from the battery 5 is supplied to the electrically-driven calipers 1fl–1rr and the electrically-driven brake control device 14. Accordingly, the electrically-driven calipers 1fl–1rr can be kept in a state to be able to generate braking forces.

In the case where disconnection occurs on the first power supply line 30 between the battery 5 and the junction 42, the power-source control device 15 detects abnormality in a charging state to warn a driver thereof. At this time, generated electric power from the electric generator 6 is supplied to the electrically-driven calipers 1fl–1rr and the electrically-driven brake control device 14. Near at a vehicle stopping speed, supplying of electric power is maintained by interrupting the clutch 63 and driving the electric generator 6 with the engine 62. Accordingly, the electrically-driven calipers 1fl–1rr can be kept in a state to be able to generate braking forces, and braking torque due to electric power generation of the electric generator 6 can be ensured.

In the case where disconnection occurs on the second power supply line 33, the power-source control device 15 detects abnormality in the electrically-driven brake control device 14 to warn a driver thereof. At this time, the electric generator 6 charges the battery 5 with generated electric power to generate a braking torque due to electric power generation to generate braking forces for the vehicle. Also, in the case where the battery 5 is in a fully charged state and charging sufficient to generate braking forces cannot be made, the power-source control device 15 controls the power-source connection device 25 in a state of connection to thereby cause the electric load 65' to consume electric power generated by the electric generator 6.

In this manner, also in the case where the first power supply line 30 or the second power supply line 33 is subjected to disconnection, braking forces for the vehicle can be generated by the electrically-driven brake device or the electric generator 6.

<Grounding>

In the case where grounding (i.e., ground fault) occurs on the power supply line 34 between the junction 41 and the power-source connection device 23 and on the power supply line 31, a larger current than that on normal occasions flows from the battery 5 to the power-source connection device 21. The power-source control device 15 detects such excess current to warn a driver of abnormality and at the same time switches the power-source connection device 21 to a state of interruption. At this time, electric power from the battery 5 is supplied to the electrically-driven calipers 1*fl*–1*rr* and the electrically-driven brake control device 14. Accordingly, the electrically-driven calipers 1*fl*–1*rr* can be kept in a state to be able to generate braking forces.

In the case where grounding occurs on the power supply line 35 between the junction 42 and the power-source connection device 22 and on the power supply line 32, a larger current than that on normal occasions flows from the battery 5 to fuse a fuse 25. Then, a larger current than that on normal occasions flows from the electric generator 6 to the power-source connection device 21. The power-source control device 15 detects abnormality in a state of charging and such excess current to warn a driver thereof, and at the same time switches the power-source connection devices 21, 22 to a state of interruption and switches the power-source connection device 23 to a state of connection. At this time, generated electric power from the electric generator 6 is supplied to the electrically-driven calipers 1*fl*–1*rr* and the electrically-driven brake control device 14 via the power-source connection device 23. Near at a vehicle stopping speed, supplying of electric power is maintained by interrupting the clutch 63 and driving the electric generator 6 with the engine 62. Accordingly, the electrically-driven calipers 1*fl*–1*rr* can be kept in a state to be able to generate braking forces, and braking torque due to electric power generation of the electric generator 6 can be also ensured.

In the case where grounding occurs on the power supply line 34 between the junction 43 and the power-source connection device 23, on the power supply line 35 between the junction 43 and the power-source connection device 22 and on the second power supply line 33 from the junction 43 to the electrically-driven calipers 1*fl*–1*rr*, a larger current than that on normal occasions flows from the battery 5 to the power-source connection device 22. The power-source control device 15 detects such excess current to warn a driver of abnormality and, at the same time, switches the power-source connection device 22 to a state of interruption. At this time, the electric generator 6 charges the battery 5 with generated electric power to thereby generate braking torque due to electric power generation, thus enabling generating braking forces for the vehicle. Also, in the case where the battery 5 is in a fully charged state and charging sufficient to generate braking forces cannot be made, the power-source control device 15 controls the power-source connection device 25 in a state of connection to thereby cause the electric load 65 to consume electric power generated by the electric generator 6.

In this manner, also in the case where the first power supply line 30 or the second power supply line 33 is subjected to grounding, braking forces for the vehicle can be generated by the electrically-driven brake device or the electric generator 6.

In the above-described operation, in the case where disconnection or grounding occurs on the first power supply line 30 or the second power supply line 33, it is possible to separate that power supply circuit, in which abnormality occurs, and to generate braking forces for the vehicle by means of the electrically-driven brake device or the electric generator 6. Accordingly, it is possible to ensure sufficient braking forces, thus enabling realizing a power-supply unit of high reliability.

Figure 2:
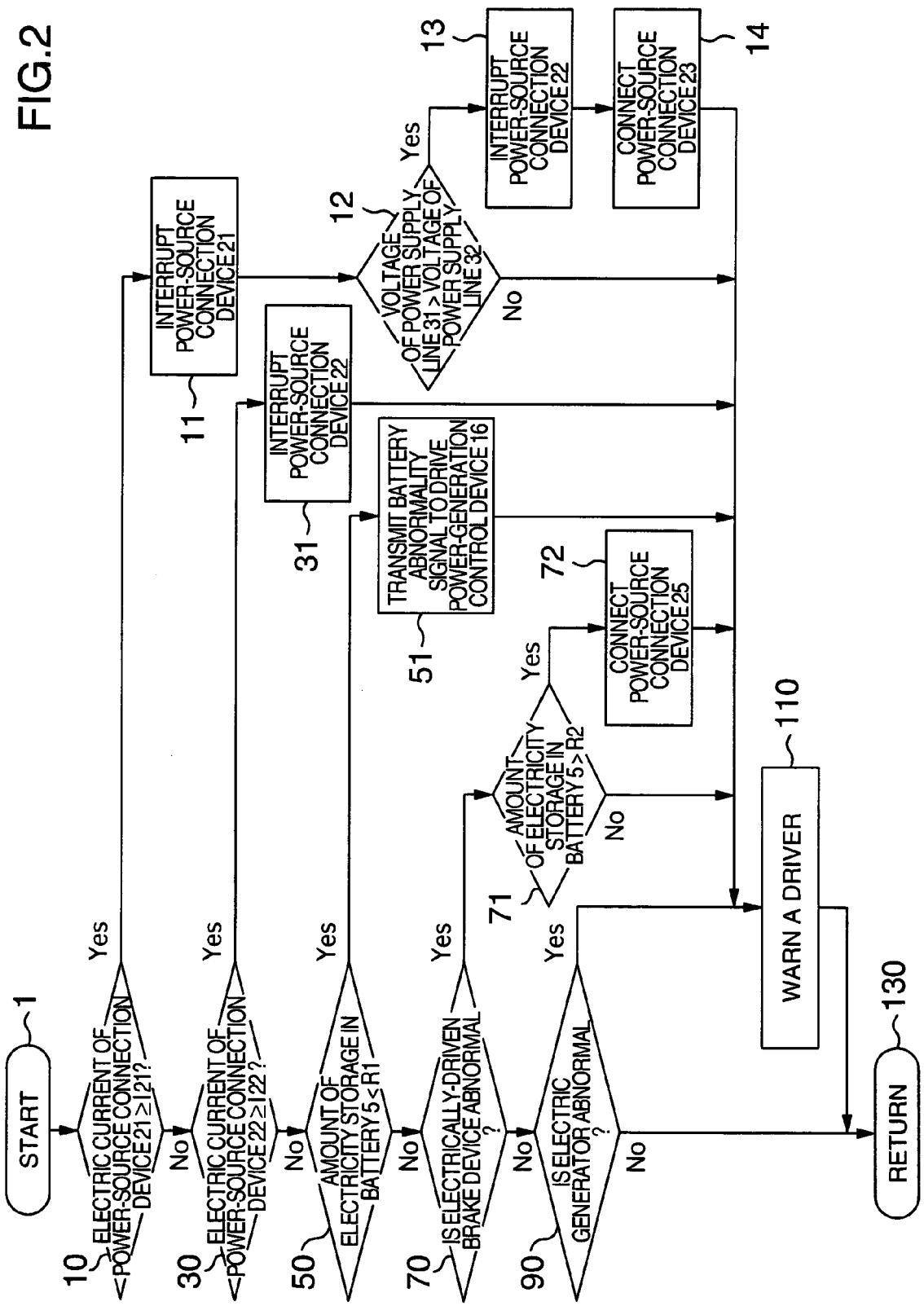
FIG. 2 is a flowchart showing an operation of the first embodiment.

FIG. 2 shows a control routine of the power-source control device 15.

Detection of abnormality is started from STEP 10.

In STEP 10, it is determined whether current over a current threshold value 121 for detection of excess current flows through the power-source connection device 21 or not. When it is affirmed, a processing in STEP 11 is executed, and when it is denied, a processing in STEP 30 is executed. In STEP 11, a processing for interruption of the power-source connection device 21 is executed, and proceeds to STEP 12. In STEP 12, voltage on the power supply line 31 is compared with that on the power supply line 32, and when voltage on the power supply line 31 is higher than that on the power supply line 32, it is determined that grounding (i.e., ground fault) occurs on a side of the power supply line 32, and the processing proceeds to a processing in STEP 13. When it is not so, it is determined that grounding occurs on a side of the power supply line 31, the processing proceeds to a processing in STEP 110. In STEP 13, the power-source connection device 22 is controlled to be put in a state of interruption, and the processing proceeds to STEP 14. In STEP 14, the power-source connection device 23 is controlled to be put in a state of connection. The processings in STEPs 11, 13 and 14 make it possible to separate abnormality on the power supply line 32 from normal power supply lines.

In STEP 30, it is determined whether current over a predetermined current value 122 flows through the power-source connection device 22 or not. When it is affirmed, a processing in STEP 31 is executed, and when it is denied, a processing in STEP 50 is executed. In STEP 31, it is determined that grounding occurs on the power supply line on a side of the electrically-driven brake device, and the power-source connection device 22 is controlled to be put in a state of interruption. When the processing in STEP 50 is terminated, it proceeds to STEP 110.

In STEP 50, it is determined whether an amount of electricity stored in the battery 5 is below a predetermined electricity storage rate R1 or not. When it is affirmed, a processing in STEP 51 is executed, and when it is denied, a processing in STEP 70 is executed. In STEP 51, a signal to the effect that the battery is abnormal is transmitted to the drive power-generation control device 16. Thereby, the drive power-generation control device 16 disconnects the clutch 63 and continues driving of the engine so that an operation of power generation is not stopped even at the time of vehicle stoppage. After the processing in STEP 51 is executed, it proceeds to STEP 110.

In STEP 70, it is determined on the basis of a signal from the electrically-driven brake control device 14 whether the electrically-driven brake device is in an abnormal state or not. When it is affirmed, a processing in STEP 71 is executed, and when it is denied, a processing in STEP 90 is executed. In STEP 71, it is determined whether an amount of electricity stored in the battery 5 is over a predetermined electricity storage rate R2 or not. When it is affirmed, it is determined that electric power generated by a generation braking torque cannot be charged, and in STEP 72, the power-source connection device 25 is controlled to be put in a state of connection. When it is denied in STEP 71, the processing proceeds to STEP 110.

In STEP 90, it is determined on the basis of a signal from the drive power-generation control device 16 whether the generator is in an abnormal state or not. When it is affirmed, the processing in STEP 110 is executed, and when it is denied, a processing in STEP 130 is executed. In STEP 110, the processing for warning a driver of occurrence of abnormality is executed, and proceeds to STEP 130. In STEP 130, the processing returning to STEP 1 is executed, and detection of abnormality is repeated.

Second Embodiment

Figure 3:
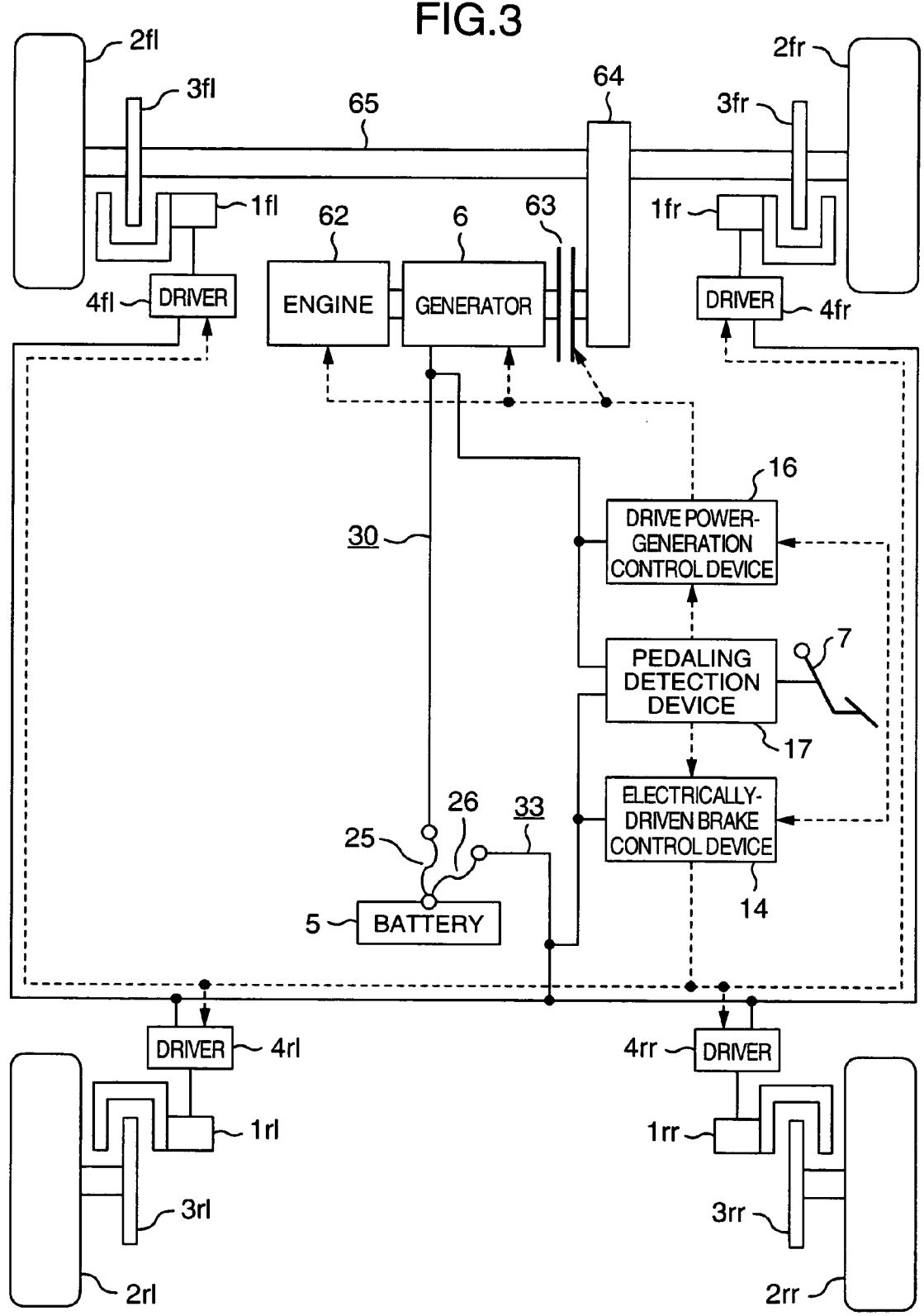
FIG. 3 is a view showing a system configuration of a power-supply unit according to a second embodiment of the invention.

Subsequently, a second embodiment of the invention will be described hereinafter with reference to FIG. 3. In a power-supply unit according to the second embodiment, the first power supply line 30 and the second power supply line 33 are connected to a terminal of a battery 5 so that even in the case where abnormality such as disconnection, grounding or the like occurs in a first power supply line 30 and a second power supply line 33, braking forces can be ensured in either the electrically-driven brake device or the electric generator 6. In addition, in FIG. 3, the same constituents as those shown in FIG. 1 are denoted by the same reference numerals as those in the latter, and description therefor will be omitted.

The first power supply line 30 is connected to the battery 5 via a fuse 25 provided close to the terminal of the battery 5. The second power supply line 33 is connected to the battery 5 via a fuse 26 provided close to the terminal of the battery 5. The fuses 25, 26 function as power-source connection devices.

An operation of the power-supply unit constructed in the above-described manner will be described hereinafter.

<Normal Occasion>

On a normal occasion, the unit operates in the same manner as that of the first embodiment.

<Abnormal Occasion>

<Abnormality in Devices Connected>

In the case where the battery 5 is consumed and cannot supply a sufficient electric power to electrically-driven calipers 1fl–1rr, a pedaling detection device 17 detects voltage drop in the battery 5 to warn a driver thereof. At this time, generated electric power from the electric generator 6 is supplied to the electrically-driven calipers 1fl–1rr and the electrically-driven brake control device 14. Near at a vehicle stopping speed, supplying of electric power is maintained by interrupting the clutch 63 and driving the electric generator 6 with the engine 62. Accordingly, the electrically-driven calipers 1fl–1rr can be kept in a state to be able to generate braking forces, and braking torque due to electric power generation of the electric generator 6 can be ensured.

In the case where abnormality occurs in the electric generator 6 and electric power cannot be supplied by electric power generation, the pedaling detection device 17 detects abnormality in the drive power-generation control device 16 to warn a driver thereof. At this time, electric power from the battery 5 is supplied to the electrically-driven calipers 1fl–1rr and the electrically-driven brake control device 14. Accordingly, the electrically-driven calipers 1fl–1rr can be kept in a state to be able to generate braking forces.

In the case where abnormality occurs in the electrically-driven brake device and braking forces cannot be generated by the electrically-driven calipers 1fl–1rr, the pedaling detection device 17 detects abnormality in the electrically-driven brake control device 14 to warn a driver thereof. At this time, the electric generator 6 charges the battery 5 with generated electric power to thereby generate braking torque due to electric power generation, thus enabling generating braking forces for the vehicle. Also, since the drive power-generation control device 16 controls an amount of electricity stored in the battery 5 to make the same sufficient to generate braking torque due to electric power generation, it is possible to surely generate the braking torque due to electric power generation.

In this manner, also in the case where abnormality occurs in one of the electrically-driven brake device, the battery 5 and the electric generator 6, braking forces for the vehicle can be generated by the electrically-driven brake device or the electric generator 6.

<Disconnection>

In the case where disconnection occurs on the first power supply line 30, the pedaling detection device 17 compares voltage on the first power supply line 30 with that on the second power supply line to determine disconnection in the case where voltage difference is larger than a predetermined value, thus warning a driver thereof. At this time, electric power from the battery 5 is supplied to the electrically-driven calipers 1fl–1rr and the electrically-driven brake control device 14. Accordingly, the electrically-driven calipers 1fl–1rr can be kept in a state to be able to generate braking forces.

In the case where disconnection occurs on the second power supply line 33, the pedaling detection device 17 detects abnormality in the electrically-driven brake control device 14 to warn a driver thereof. At this time, the electric generator 6 charges the battery 5 with generated electric power to thereby generate braking torque due to electric power generation, thus enabling generating braking forces for the vehicle. Also, since the drive power-generation control device 16 controls an amount of electricity stored in the battery 5 to make the same sufficient to generate braking torque due to electric power generation, it is possible to surely generate the braking torque due to electric power generation.

In this manner, also in the case where disconnection occurs in the first power supply line 30 or the second power supply line 33, braking forces for the vehicle can be generated by the electrically-driven brake device or the electric generator 6.

<Grounding>

In the case where grounding occurs on the first power supply line 30, a larger current than that on normal occasions flows to the fuse 25 from the battery 5, so that the fuse 25 fuses. The pedaling detection device 17 compares voltage on the first power supply line 30 with that on the second power supply line to determine that the fuse 25 has fused due to grounding in the case where voltage difference is larger than a predetermined value, thus warning a driver thereof. At this time, electric power from the battery 5 is supplied to the electrically-driven calipers 1fl–1rr and the electrically-driven brake control device 14. Accordingly, the electrically-driven calipers 1fl–1rr can be kept in a state to be able to generate braking forces.

In the case where grounding occurs on the second power supply line 33, a larger current than that on normal occasions flows to the fuse 26 from the battery 5, so that the fuse 26 fuses. The pedaling detection device 17 detects abnormality in the electrically-driven brake control device 14 to warn a driver thereof. At this time, the electric generator 6 charges the battery 5 with generated electric power to thereby generate braking torque due to electric power generation, thus enabling generating braking forces for the vehicle.

In this manner, also in the case where the first power supply line 30 or the second power supply line 33 is subjected to grounding, braking forces for the vehicle can be generated by the electrically-driven brake device or the electric generator 6.

In the above-described operation, in the case where disconnection or grounding occurs on the first power supply line 30 or the second power supply line 33, it is possible to insulate and separate that power supply system, in which abnormality occurs, and to generate braking forces for the vehicle by means of the electrically-driven brake device or the electric generator 6. Besides, since two power-source connection devices are provided in the vicinity of the terminal of the battery 5, the second embodiment is made simpler in constitution than the first embodiment.

Third Embodiment

Figure 4:
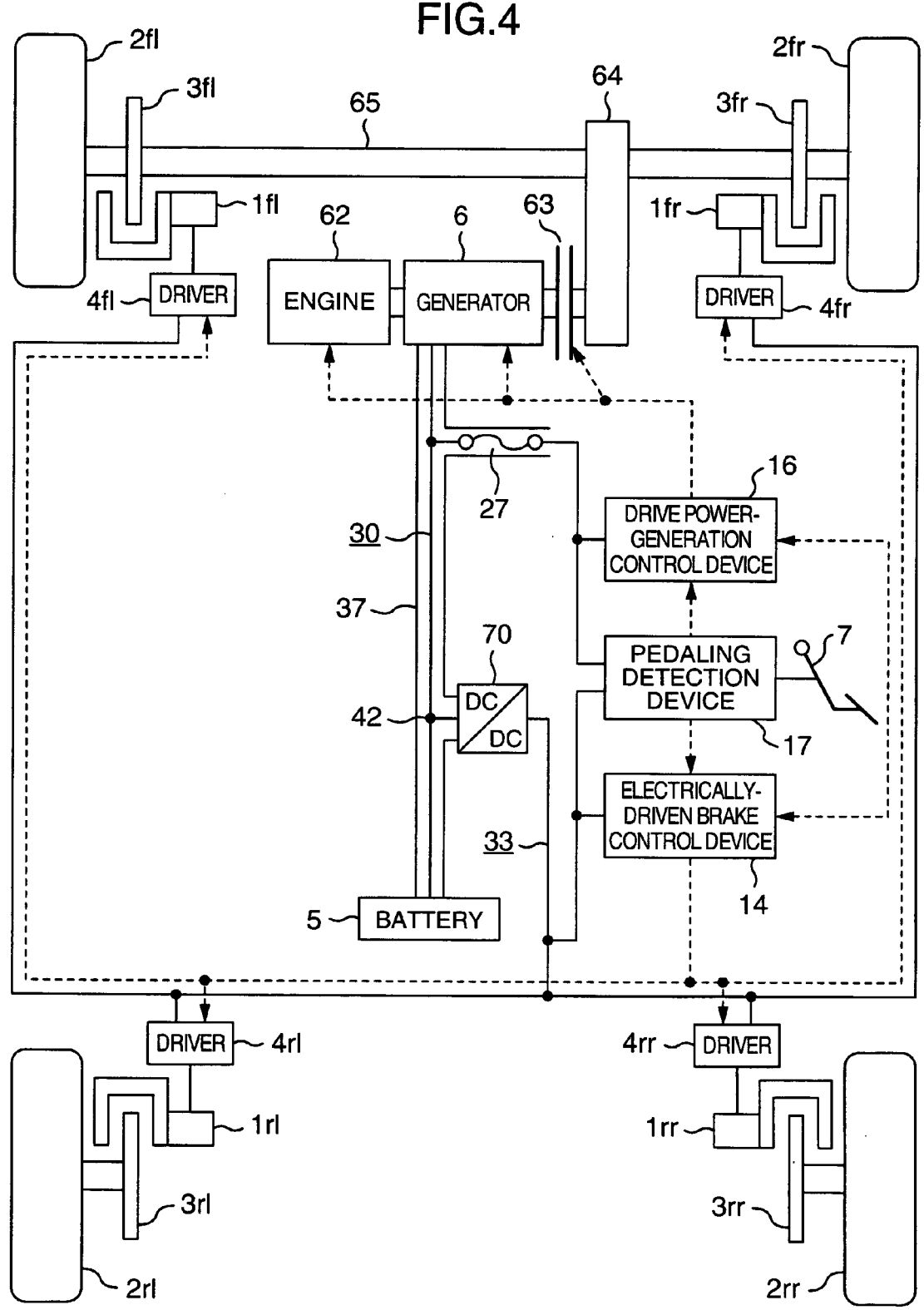
FIG. 4 is a view showing a system configuration of a power-supply unit according to a third embodiment of the invention.

Subsequently, a third embodiment of the invention will be described hereinafter with reference to FIG. 4. With a power-supply unit according to the third embodiment, a grounding preventive member 37 covers a first power supply line 30 to prevent the same from grounding, thus avoiding grounding of the first power supply line 30. At this time, also in the case where abnormality such as disconnection on the first power supply line 30, and disconnection, grounding or the like on a second power supply line 33 occurs, the power-supply unit can ensure braking forces of either the electrically-driven brake device or the electric generator 6. In addition, in FIG. 4, the same constituents as those shown in FIG. 1 are denoted by the same reference numerals as those in the latter, and an description therefor is omitted or simplified.

The first power supply line 30 is covered by the grounding preventive member 37 for prevention of grounding, for example, a length of hose made of an insulating material, or a rigid casing less susceptible to changes in shape from external forces. The second power supply line 33 is connected to the first power supply line 30 through a voltage transducer 70, which serves as a power-source connection device. The voltage transducer 70 functions to stop voltage transduction and shutting off a power-source when an excess current caused by grounding on an output side is detected. The drive power-generation control device 16 and the pedaling detection device 17 are connected to the first power supply line 30 via a fuse 27, which serves as a power-source connection device.

An operation of the power-supply unit constructed in the above-described manner will be described hereinafter.

<Normal Occasion>

On a normal occasion, the unit operates in the same manner as that of the first embodiment.

<Abnormal Occasion>

<Abnormality in Devices Connected>

In the case where abnormality occurs in any one of the battery 5, the electric generator 6, and the electrically-driven brake device, the unit operates in the same manner as that of the second embodiment.

<Disconnection>

In the case where disconnection occurs on the first power supply line 30 between the electric generator 6 and the junction 42, the voltage transducer 70 detects a voltage change on the first power supply line 30 to determine disconnection in the case where the voltage change is larger than a predetermined value, thus warning a driver thereof. At this time, electric power from the battery 5 is supplied to the electrically-driven calipers 1fl–1rr and the electrically-driven brake control device 14. Accordingly, the electrically-driven calipers 1fl–1rr can be kept in a state to be able to generate braking forces.

In the case where disconnection occurs on the first power supply line 30 between the battery 5 and the junction 42, the drive power-generation control device 16 detects impossibility of control on charging in the battery 5 to warn a driver thereof. At this time, electric power generated from the electric generator 6 is supplied to the electrically-driven calipers 1fl–1rr and the electrically-driven brake control device 14. Near at a vehicle stopping speed, supplying of electric power is maintained by interrupting a clutch 63 and driving the electric generator 6 with the engine 62. Accordingly, the electrically-driven calipers 1fl–1rr can be kept in a state to be able to generate braking forces, and braking torque due to electric power generation of the electric generator 6 can be also ensured.

In the case where disconnection occurs on the second power supply line 33, the pedaling detection device 17 detects abnormality in the electrically-driven brake control device 14 to warn a driver thereof. At this time, the electric generator 6 charges the battery 5 with generated electric power to thereby generate braking torque due to electric power generation, thus enabling generating braking forces for the vehicle. Also, since the drive power-generation control device 16 controls an amount of electricity stored in the battery 5 to make the same sufficient to generate braking torque due to electric power generation, it is possible to surely generate the braking torque due to electric power generation.

In this manner, also in the case where disconnection occurs on the first power supply line 30 or the second power supply line 33, braking forces for the vehicle can be generated by the electrically-driven brake device or the electric generator 6.

<Grounding>

Grounding on the first power supply line 30 can be prevented by the protective member. In the case where grounding occurs on the second power supply line 33, the voltage transducer 70 exhibits its excess current protective function to stop the electric power supplying operation. The pedaling detection device 17 detects abnormality in the electrically-driven brake control device 14 to warn a driver thereof. At this time, the electric generator 6 charges the battery 5 with generated electric power to thereby generate braking torque due to electric power generation, thus enabling generating braking forces for the vehicle.

In the case where grounding occurs on the power supply line between the drive power-generation control device 16 or the pedaling detection device 17 and the first power supply line 30, an excess current fuses the power-source connection device 27. The pedaling detection device 17 detects abnormality in the drive power-generation control device 16 to warn a driver thereof. At this time, it is possible to maintain supplying of electric power to the electrically-driven calipers 1*fl*–1*rr* from the battery 5 and the electric generator 6. Accordingly, the electrically-driven calipers 1*fl*–1*rr* can be kept in a state to be able to generate braking forces, and braking torque due to electric power generation of the electric generator 6 also can be ensured.

In this manner, also in the case where grounding occurs, braking forces for the vehicle can be generated by the electrically-driven brake device or the electric generator 6.

With the above-described operation, in the case where disconnection or grounding occurs in the first power supply line 30 or the second power supply line 33, it is possible to insulate and separate that power supply circuit, in which abnormality occurs, and to generate braking forces for the vehicle by means of the electrically-driven brake device or the electric generator 6. Besides, since there is no need of wiring in an annular manner, the third embodiment is made simpler in constitution than the first embodiment. Accordingly, it is possible to ensure sufficient braking forces, thus enabling realizing a simpler power-supply unit of high reliability.

Also, while the battery 5 is provided as a single body to serve as a storage device in the first, second and third embodiments, there is conceivable a configuration, in which a separate storage device is connected to, for example, the second power supply line 33. Thereby, since there is no need of continuing power generation in the electric generator 6 even in the case where abnormality occurs in the battery 5, it becomes not only unnecessary to control interruption of the clutch 63 near at a vehicle stopping speed but also possible to supply a more stable electric power to the electrically-driven brake device. Accordingly, it is possible to realize a power-supply unit of higher reliability. Also, there is conceivable a configuration, in which a power generation device such as a fuel cell is connected to, for example, the second power supply line 33. Thereby, it is also possible to use a fuel cell as an electric generator. Thereby, since there is no need of continuing power generation in the electric generator 6 even in the case where abnormality occurs in the battery 5, it becomes not only unnecessary to control interruption of the clutch 63 but also possible to supply a more stable electric power to the electrically-driven brake device. Further, when the electric generator 6 can be driven by supply electricity of a fuel cell, vehicular driving with the engine 62 is made unnecessary. Accordingly, it is possible to realize a simpler power-supply unit of high reliability.

With the power-supply unit according to the invention, when abnormality occurs in the power-supply unit or the electrically-driven brake device, an electrically-driven brake device or electric generator, which can operate normally, is ensured by separating a portion, in which abnormality occurs. Accordingly, also in the case where abnormality occurs, it is possible to generate a sufficient braking force and to realize a simple power-supply unit of high reliability.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An electric power-supply unit for automobiles comprising:
   an electrically driven brake device for generating braking forces by being electrically driven;
   an electric generator for generating an electric power and a braking force accompanied with the electric power generation;
   an electric power storage device for storing the electric power generated by the electric generator;
   a first electric power supply line electrically connecting the electric generator and the electric power storage device;
   a first connecting device, provided on the first electric power supply line, for connecting and disconnecting electric connection between the electric power generator and the electric power storage device through the first electric power supply line;
   a second electric power supply line electrically connecting the electrically driven brake device to the first electric power supply line at a first location between the electric power generator and the first connecting device and at a second location between the electric power storage device and the first connecting device;
   a second connecting device, provided on the second electric power supply line between the second location and the electrically driven brake device, for connecting and disconnecting electric connection between the first electric power supply line and the electrically driven brake device through the second electric power supply line; and
   a third connecting device, provided on the second electric power supply line between the first location and the electrically driven brake device, for connecting and disconnecting electric connection between the first electric power supply line and the electrically driven brake device through the second electric power supply line; and
   wherein said first, second and third connecting devices perform electrical connection and disconnection of respective electric power supply lines independently from one another.

2. An electric power-supply unit for automobiles according to claim 1, wherein said first, second and third connecting devices are capable of switching between the electrical connection and disconnection of respective electric power supply lines.

3. An electric power-supply unit for automobiles according to claim 1, further comprising an electric power source control device for controlling the first, second and third connecting devices.

4. An electric power-supply unit for automobiles according to claim 3, wherein when an abnormal condition is detected in said electric power generator, said electric power storage device, said electrically driven brake device, said first connecting device, said second connecting device or said third connecting device, said electric power source control device changeovers combination of connection and disconnection of said first, second and third connecting device are in accordance with the detected abnormal condition.

5. An electric power-supply unit for automobiles according to claim 3, wherein said electric power source control device sets said third connecting device in electrically disconnection state when said first and second connecting devices are in electrically connection state.

6. An electric power-supply unit for automobiles according to claim 3, wherein when a ground fault occurs on the first electric power supply line between the electric power generator and the first connecting device and on the second electric power supply line between the second location and the third connecting device, said electric power source control device sets said first and third connecting devices in electrically disconnection state and said second connecting device in electrically connection state so that said electrically driven brake device is driven by electric power from the electric power storage device.

7. An electric power-supply unit for automobiles according to claim 3, wherein when a ground fault occurs on the first electric power supply line between the electric power storage device and the first connecting device and on the second electric power supply line between the first location and the third connecting device, said electric power source control device sets said first and second connecting devices in electrically disconnection state and said third connecting device in electrically connection state, so that said electrically driven brake device is driven by electric power from the electric power generator.

8. An electric power-supply unit for automobiles according to claim 3, wherein when a ground fault occurs on the second electric power supply line between the second connecting device and the electrically driven brake device or between the third connecting device and the electrically driven brake device, said electric power source control device sets said second and third connecting devices in electrically disconnection state and said first connecting device in electrically connection state and electric power generated by the electric generator is charged in the electric power storage device so that braking torque is generated by the electric power generator.

9. An electric power-supply unit for automobiles according to claim 3, further comprising a fourth connecting device for connecting an electric load to the first electric power supply line between the first connecting device and the electric power storage device, and wherein when a ground fault occurs on the second electric power supply line between the second connecting device and the electrically driven brake device or between the third connecting device and the electrically driven brake device, said electric power source control device sets said second and third connecting devices in electrically disconnection state and said first and fourth connecting devices in electrically connection state and electric power generated by the electric generator is consumed by the electric load, whereby a braking torque is generated by the electric power generator.

10. An electric power-supply unit for automobiles according to claim 1, further comprising electric loads other than the electrically-driven brake device and connected to the first electric power supply line, power-source connection means arranged between the first electric power supply line and the electric loads, and a power-source control device for detecting interruption between the electrically-driven brake device and the first electric power supply line to control connection of the power-source connection means.

11. An electric power-supply unit for automobiles comprising:
   a first electric power supply line electrically connecting an electric generator, which generates an electric power and a braking force accompanied with the electric power generation, and an electric power storage device, which stores the electric power generated by the electric generator;
   a first connecting device, provided on the first electric power supply line, for connecting and disconnecting electric connection between the electric power generator and the electric power storage device through the first electric power supply line;
   a second electric power supply line electrically connecting an electrically driven brake device, which generates a braking force, to the first electric power supply line at a first location between the electric power generator and the first connecting device and at a second location between the electric power storage device and the first connecting device;
   a second connecting device, provided on the second electric power supply line between the second location and the electrically driven brake device, for connecting and disconnecting electric connection between the first electric power supply line and the electrically driven brake device through the second electric power supply line;
   a third connecting device, provided on the second electric power supply line between the first location and the electrically driven brake device, for connecting and disconnecting electric connection between the first electric power supply line and the electrically driven brake device through the second electric power supply line; and
   an electric power source control device for controlling the first, second and third connecting devices; and
   wherein said first, second and third connecting devices perform electrical connection and disconnection of respective electric power supply lines independently from one another.

12. An electric power-supply unit for automobiles according to claim 11, wherein said first, second and third connecting devices are capable of switching between the electrical connection and disconnection of respective electric power supply lines.

13. An electric power-supply unit for automobiles according to claim 11, wherein said electric power source control device sets said third connecting device in electrically disconnection state when said first and second connecting devices are in electrically connection state.

14. An electric power-supply unit for automobiles according to claim 11, wherein when an abnormal condition is detected in said electric power generator, said electric power storage device, said electrically driven brake device, said first connecting device, said second connecting device or said third connecting device, said electric power source control device changeovers combination of connection and disconnection of said first, second and third connecting device are in accordance with the detected abnormal condition.

15. An electric power-supply unit for automobiles according to claim 11, wherein when a ground fault occurs on the first electric power supply line between the electric power generator and the first connecting device and on the second electric power supply line between the second location and the third connecting device, said electric power source control device sets said first and third connecting devices in electrically disconnection state and said second connecting device in electrically connection state so that said electrically driven brake device is driven by electric power from the electric power storage device.

16. An electric power-supply unit for automobiles according to claim 11, wherein when a ground fault occurs on the first electric power supply line between the electric power storage device and the first connecting device and on the second electric power supply line between the first location and the third connecting device, said electric power source control device sets said first and second connecting devices in electrically disconnection state and said third connecting device in electrically connection state, so that said electrically driven brake device is driven by electric power from the electric power generator.

17. An electric power-supply unit for automobiles according to claim 11, wherein when a ground fault occurs on the second electric power supply line between the second connecting device and the electrically driven brake device or between the third connecting device and the electrically driven brake device, said electric power source control device sets said second and third connecting devices in electrically disconnection state and said first connecting device in electrically connection state and electric power generated by the electric generator is charged in the electric power storage device so that braking torque is generated by the electric power generator.

18. An electric power-supply unit for automobiles according to claim 11, further comprising a fourth connecting device for connecting an electric load to the first electric power supply line between the first connecting device and the electric power storage device, and wherein when a ground fault occurs on the second electric power supply line between the second connecting device and the electrically driven brake device or between the third connecting device and the electrically driven brake device, said electric power source control device sets said second and third connecting devices in electrically disconnection state and said first and fourth connecting devices in electrically connection state and electric power generated by the electric generator is consumed by the electric load, whereby braking torque is generated by the electric power generator.

* * * * *